United States Patent
Lee et al.

(10) Patent No.: US 7,791,674 B2
(45) Date of Patent: Sep. 7, 2010

(54) SCALER AND METHOD OF SCALING A DATA SIGNAL

(75) Inventors: Dong-Hoon Lee, Suwon-si (KR); Chang-Dae Park, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1122 days.

(21) Appl. No.: 11/322,387

(22) Filed: Jan. 3, 2006

(65) Prior Publication Data

US 2006/0146194 A1   Jul. 6, 2006

(30) Foreign Application Priority Data

Jan. 4, 2005   (KR) .................... 10-2005-0000507

(51) Int. Cl.
H04N 7/01 (2006.01)
H04N 5/445 (2006.01)
H04N 9/74 (2006.01)
H04N 11/20 (2006.01)
G09G 5/02 (2006.01)

(52) U.S. Cl. ............. 348/582; 348/441; 348/561; 348/567; 348/453; 345/600

(58) Field of Classification Search ............. 348/561, 348/567, 568, 582
See application file for complete search history.

(56) References Cited

U.S. PATENT DOCUMENTS

| | | | | |
|---|---|---|---|---|
| 5,467,144 A * | 11/1995 | Saeger et al. | ................. | 348/566 |
| 5,812,210 A * | 9/1998 | Arai et al. | ................... | 348/555 |
| 6,147,695 A * | 11/2000 | Bowen et al. | ................ | 345/503 |
| 6,151,078 A * | 11/2000 | Yoneda et al. | .............. | 348/558 |
| 6,327,000 B1 * | 12/2001 | Auld et al. | .................. | 348/441 |
| 6,369,855 B1 * | 4/2002 | Chauvel et al. | .......... | 348/423.1 |
| 6,421,094 B1 * | 7/2002 | Han | ........................... | 348/569 |
| 6,493,036 B1 * | 12/2002 | Fernandez | .................. | 348/561 |
| 6,542,162 B1 * | 4/2003 | Hrusecky et al. | ............ | 345/629 |
| 6,542,201 B1 * | 4/2003 | Song et al. | .................. | 348/561 |
| 6,642,934 B2 * | 11/2003 | Hrusecky et al. | ............ | 345/629 |
| 6,681,285 B1 * | 1/2004 | Ng | .............................. | 710/309 |
| 6,859,236 B2 * | 2/2005 | Yui | ............................. | 348/584 |
| 6,903,753 B1 * | 6/2005 | Gray et al. | .................... | 345/634 |
| 6,982,729 B1 * | 1/2006 | Lange et al. | ................. | 345/660 |
| 7,061,544 B1 * | 6/2006 | Nonomura et al. | .......... | 348/568 |
| 7,154,558 B2 * | 12/2006 | Yui et al. | ..................... | 348/565 |
| 7,202,912 B2 * | 4/2007 | Aneja et al. | ................. | 348/569 |
| 7,206,025 B2 * | 4/2007 | Choi | .......................... | 348/441 |

(Continued)

FOREIGN PATENT DOCUMENTS

JP    10-126786    5/1998

(Continued)

Primary Examiner—Brian P Yenke
(74) Attorney, Agent, or Firm—Harness, Dickey & Pierce, P.L.C.

(57) ABSTRACT

A scaler and method of scaling a data signal. In an example, the scaler may include an offset calculator receiving a data signal including a first signal (e.g., a chrominance signal) and a second signal (e.g., a luminance signal) and determining an initial offset relationship between the first signal and the second signal. The example scaler may further include a scaler core performing a scaling process on the received data signal based on a designated sampling mode and the determined initial offset relationship.

20 Claims, 3 Drawing Sheets

U.S. PATENT DOCUMENTS

| | | | |
|---|---|---|---|
| 7,206,029 B2 * | 4/2007 | Cohen-Solal | 348/565 |
| 7,212,218 B2 * | 5/2007 | Suzuki et al. | 345/660 |
| 7,224,404 B2 * | 5/2007 | An et al. | 348/584 |
| 7,333,149 B2 * | 2/2008 | Choi | 348/441 |
| 7,420,619 B2 * | 9/2008 | Cha | 348/561 |
| 7,474,355 B2 * | 1/2009 | Leone et al. | 348/453 |
| 7,545,441 B2 * | 6/2009 | Okamoto | 348/569 |
| 2001/0022816 A1 * | 9/2001 | Bakhmutsky et al. | 375/240.17 |
| 2002/0075407 A1 * | 6/2002 | Cohen-Solal | 348/565 |
| 2002/0080280 A1 * | 6/2002 | Champion et al. | 348/584 |
| 2004/0107438 A1 * | 6/2004 | Sekiguchi et al. | 725/43 |
| 2005/0231526 A1 * | 10/2005 | MacInnis et al. | 345/592 |

FOREIGN PATENT DOCUMENTS

| | | |
|---|---|---|
| JP | 2000-316141 | 11/2000 |
| JP | 2003-324695 | 11/2003 |
| KR | 10-2004-0067170 A | 7/2004 |
| KR | 10-2004-0078531 A | 9/2004 |

* cited by examiner (a) 1/2 SUB-SAMPLE  (b) 1/4 SUB-SAMPLE

SCALER AND METHOD OF SCALING A DATA SIGNAL

PRIORITY STATEMENT

This application claims priority to Korean Patent Application No. 2005-507 filed on Jan. 4, 2005 in the Korean Intellectual Property Office, the entire contents of which are hereby incorporated by reference.

BACKGROUND OF THE INVENTION

1. Field of the Invention

Example embodiments of the present invention relate generally to a scaler and method thereof, and more particularly to a scaler and method of scaling a data signal.

2. Description of the Related Art

System-on-Chip (SOC) devices may be employed with higher bus bandwidth requirements. For example, in an SOC configured to perform a scaling-down process where a source image signal having a higher resolution is adjusted to an output image signal having a lower resolution, a plurality of buses may be employed for transferring the image signals.

A Picture in Picture (PIP) technique may allow viewers to watch more than one television (TV) program or channel at the same time on TV sets or other display devices. Typically, in a digital TV employing the PIP technique, a larger display picture is output accompanied by a smaller display image (e.g., overlapping the larger display image, on a side of the larger display image etc.), although it is understood that some PIP techniques perform a symmetrical split-screen type display with two equal-sized images. If the larger display picture is "swapped" with the smaller display picture, a scaling-down process may be performed on the larger display image so as to accommodate for the resultant lower resolution requirements. However, during the scaling-down process, signal loss (e.g., from connections and/or signal distortion due to insufficiency of available bus bandwidth) may occur, thereby degrading the viewer display.

If a higher-definition level image, for example 1080i or 720p, where 'i' may indicate an interlaced scan method and the 'p' may indicate a progressive scan method, is scaled-down by more than one half, a scaler may receive at least 2 lines of data from a memory device during a 1H time interval, where the '1H time' interval may indicate a time period for processing a single horizontal line. During the scaling-down process, traffic of an entire system bus may be increased, and available bus bandwidth may be decreased, thereby reducing a stability of the system.

SUMMARY OF THE INVENTION

An example embodiment of the present invention is directed to a scaler, including an offset calculator receiving a data signal including a first signal and a second signal and determining an initial offset relationship between the first signal and the second signal and a scaler core performing a scaling process on the received data signal based on a designated sampling mode and the determined initial offset relationship.

Another example embodiment of the present invention is directed to a method of scaling a received data signal, including receiving the data signal, the received data signal including a first signal and a second signal, determining an initial offset relationship between the first signal and the second signal and performing a scaling process on the received data signal based on a designated sampling mode and the determined initial offset relationship.

BRIEF DESCRIPTION OF THE DRAWINGS

The accompanying drawings are included to provide a further understanding of the invention, and are incorporated in and constitute a part of this specification. The drawings illustrate example embodiments of the present invention and, together with the description, serve to explain principles of the present invention.

DETAILED DESCRIPTION OF EXAMPLE EMBODIMENTS OF THE PRESENT INVENTION

Figure 1:
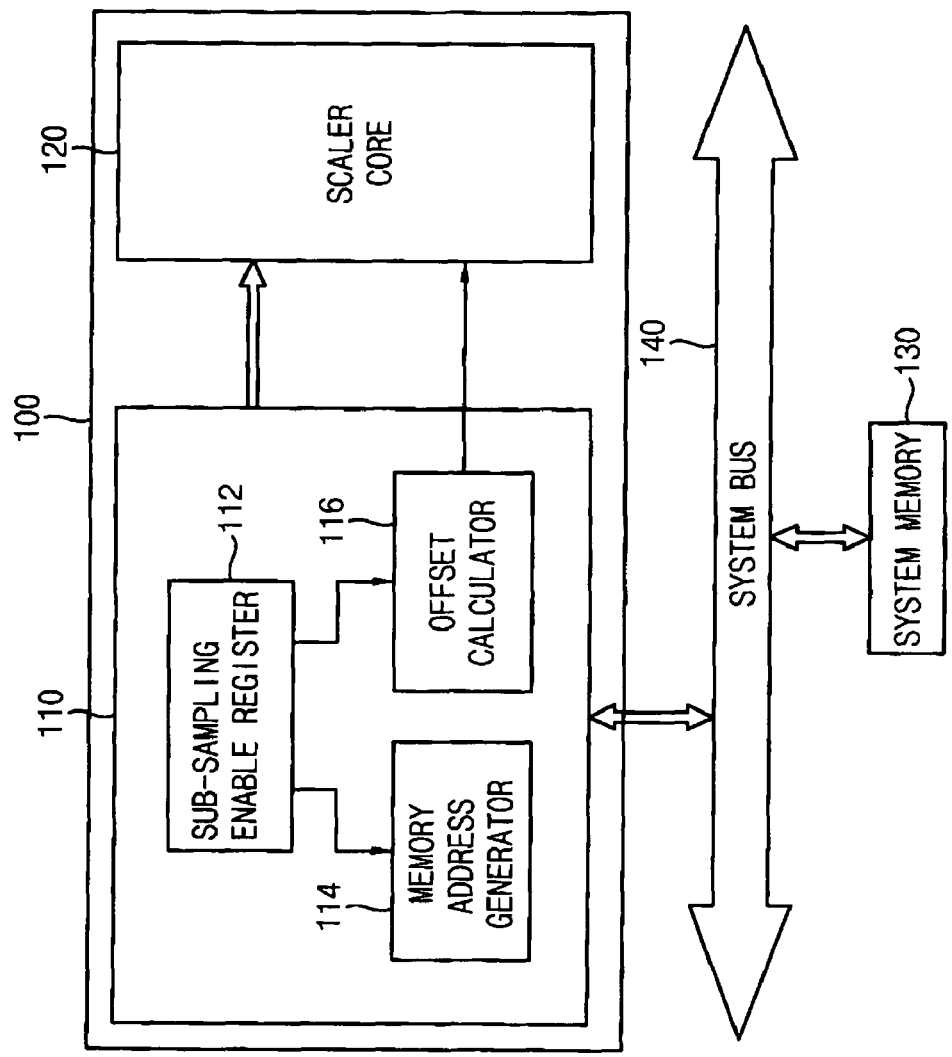
FIG. 1 is a block diagram illustrating a system according to an example embodiment of the present invention.

Detailed illustrative example embodiments of the present invention are disclosed herein. However, specific structural and functional details disclosed herein are merely representative for purposes of describing example embodiments of the present invention. Example embodiments of the present invention may, however, be embodied in many alternate forms and should not be construed as limited to the embodiments set forth herein.

Accordingly, while example embodiments of the invention are susceptible to various modifications and alternative forms, specific embodiments thereof are shown by way of example in the drawings and will herein be described in detail. It should be understood, however, that there is no intent to limit example embodiments of the invention to the particular forms disclosed, but conversely, example embodiments of the invention are to cover all modifications, equivalents, and alternatives falling within the spirit and scope of the invention. Like numbers may refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. Conversely, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

FIG. 1 is a block diagram illustrating a system according to an example embodiment of the present invention.

In the example embodiment of FIG. 1, the system may include a video scaler 100, a system bus 140 and/or a system memory 130. The video scaler 100 may include a sub-sampling block 110 for data sampling and/or a scaler core 120 for scaling (e.g., down scaling) data sampled by the sub-sampling block 110. The sub-sampling block 110 may include a sub-sampling enable register 112, a memory address generator 114 and/or an offset calculator 116.

In the example embodiment of FIG. 1, the sub-sampling enable register 112 may store a sampling mode (e.g., video data sampling mode) received from a central processing unit (CPU) (not shown). The memory address generator 114 may generate a memory address corresponding to video data to be received from the system memory 130 based on the sampling mode.

In the example embodiment of FIG. 1, the offset calculator 116 may determine an initial offset relationship between luminance signals Y and chrominance signals C of the video data. The scaler core 120 may perform a scaling process (e.g., an adjustment to a resolution of a display corresponding to the video data) on the video data based on the initial offset relationship. The scaler core 120 may include a line memory.

In the example embodiment of FIG. 1, the sub-sampling enable register 112 may store a value indicating whether a 1/n sub-sampling mode may be enabled, where n may be a natural number. The sub-sampling enable register 112 may designate the sampling mode by storing the natural number 'n' of the 1/n sub-sampling mode. If the 1/n sub-sampling mode is enabled, the memory address generator 114 may generate a memory address for reading the video data stored in the system memory 130 (e.g., n lines of the video data).

Figure 2:
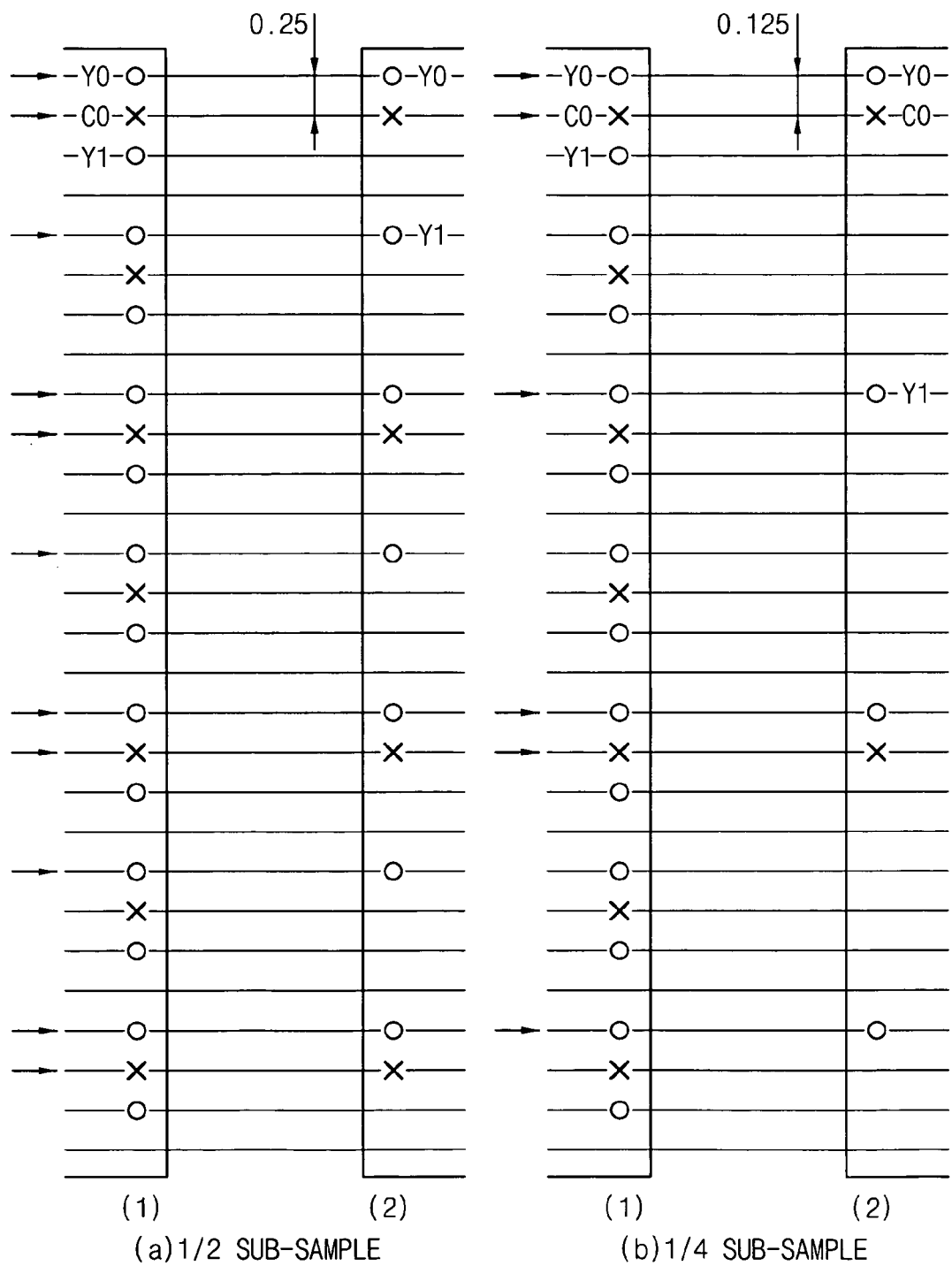
FIG. 2 is a conceptual diagram illustrating an initial offset relationship between a luminance Y signal and a chrominance C signal in a sub-sampling process according to another example embodiment of the present invention.

FIG. 2 is a conceptual diagram illustrating an initial offset relationship between a luminance Y signal and a chrominance C signal in a sub-sampling process according to another example embodiment of the present invention.

In the example embodiment of FIG. 2, a reference symbol '(a)' may indicate a ½ sub-sampling operation in a 4:2:0 sampling format. In the 4:2:0 sampling format, the Y signal may be sampled at a first frequency (e.g., 13.5 Mega-hertz (MHz)) on alternating lines, and the C (e.g., where 'C' may include Cb and Cr) signal may be sampled at a second frequency (e.g., 6.75 MHz) on alternating lines.

In the example embodiment of FIG. 2, in the ½ sub-sampling mode, a reference symbol '(1)' may denote an input column representing input data and a reference symbol '(2)' may denote a second column representing sub-sampled data or output data. In the first and second columns associated with the ½ sub-sampling mode (a), reference symbols 'O' may represent Y signals (e.g., Y data), and reference symbols 'X' may represent C signals (e.g., C data). Before the input data including the Y and C signals is sampled, there may be an initial offset (e.g., 0.5) between the 'Y0' and the 'C1' signals and/or between the 'C0' and the 'Y1' signals. After the input data is sampled in accordance with the ½ sub-sampling mode, there may be a phase difference (e.g., 0.25) between the sampled 'Y0' signal and the sampled 'C0' signal, and so on.

In the example embodiment of FIG. 2, the reference symbol '(b)' may indicate a 1/4 sub-sampling operation in the 4:2:0 sampling format. Similar to the above-described ½ sub-sampling mode, in the ¼ sub-sampling mode, the reference symbol '(1)' may denote a first column represent input data, and the reference symbol '(2)' may denote a second column representing sub-sampled data or output data. Similar to the above-described ½ sub-sampling mode, in the first and second columns associated with the ¼ sub-sampling mode, reference symbols 'O' may represent Y signals (e.g., Y data), and reference symbols 'X' may represent C signals (e.g., C data).

In the example embodiment of FIG. 2, if the Y signals are sampled in the ¼ sub-sampling mode, the C signals sampled in the ¼ sub-sampling mode may be shifted to a greater degree with respect to the Y signals as compared with the C signals sampled in the ½ sub-sampling mode.

In the example embodiment of FIG. 2, after the input data (e.g., O and X signals) is sampled in accordance with the ¼ sub-sampling mode, there may be a phase difference (e.g., 0.125) between a sampled 'C0' signal and a sampled 'Y0' signal and/or the sampled 'C0' signal and a sampled 'Y1' signal, and so on.

Returning to the example embodiment of FIG. 1, the phase difference (e.g., 0.125) between representative C signals (e.g., sampled C0 signal) and Y signals (e.g., sample Y0 signal may be compensated for by the offset calculator 116.

In the example embodiment of FIG. 1, the offset calculator 116 may determine an initial offset relationship between the C signals and the Y signals. The offset calculator 116 may calculate the initial offset relationship using 'an initial offset expression' shown in Table 1 (below). The offset calculator 116 may store the calculated initial offset relationship. In an example, the offset calculator 116 may be implemented as hardware including an adder and a multiplier. In an alternative example, the offset calculator 116 may be implemented as an executable software program (e.g., executable by any well-known processing device) implementing the offset expression of Table 1 (below).

The offset calculator 116 may calculate the initial vertical direction phase offset relationship using

TABLE 1

| Source | Offset | Zoom Offset | Initial Offset Expression |
|---|---|---|---|
| 4:2:2 Y/C Offset | TT Offset | EN = ON | 0 |
| 4:2:0 Y Offset | TB Offset | EN = ON | (SR/2) |
| | BT Offset | EN = ON | 0.5 |
| | BB Offset | EN = ON | (0.5 + SR/2) |

TABLE 1-continued

| Source | Offset | Zoom Offset | Initial Offset Expression |
|---|---|---|---|
| 4:2:0 C Offset (1/N sub-sampling read mode) | TT Offset | EN | 0.75 + 0.25 × (n − 1)/n |
| | | ON | EN + 0.5 |
| | TB Offset | EN | 0.75 + 0.25 × (n − 1)/n + SRC × 0.5 |
| | | ON | EN + 0.5 |
| | BT Offset | EN | 0.5 + 0.25 × (n − 1)/n |
| | | ON | EN + 0.5 |
| | BB Offset | EN | 0.5 + 0.25 × (n − 1)/n + SRC × 0.5 |
| | | ON | EN + 0.5 | where SR may denote a Scale Ratio, SRC may denote a Scale Ratio of C, EN may denote an Even-Number Field, ON may denote an Odd-Number Field, and n may designate a 1/n sub-sampling mode.

In the example embodiment of Table 1, as compared with the 4:2:2 sampling format, resolutions of the Y signals in the 4:2:0 sampling format may remain the same, while a resolution of the C signals may be half as much as corresponding the C signals in the 4:2:2 sampling format. In the 4:2:2 sampling format, a sampling location of the Y signals and the C signals may be the same. Thus, both the Y signals and the C signals may be calculated using the common 'initial offset expression' shown in Table 1.

In the example embodiment of Table 1, there may be various offset types based on field IDs of the input video or image data, such as the even-number (EN) field, the odd-number (ON) field and field IDs of a display device, such as a top field and a bottom field. Example offset types include top-to-top (TT), top-to-bottom (TB), bottom-to-top (BT) and bottom-to-bottom (BB). These example offset types may be calculated using the 'initial offset expression' shown in Table 1 based on a scaling ratio (SR) (e.g., a ratio of an input image to the scaled image). In an example, the top field may correspond to the even-number (EN) field, and the bottom field may correspond to the odd-number (ON) field.

In an example, referring to Table 1, if the sampling format is the 4:2:2 sampling format and the SR=1, the TT offset may equal 0 and the TB offset may equal ½. In another example, referring to Table 1, if a given portion of an image is "zoomed-in" or "zoomed-out", there may be a zoom offset. As shown in the example of Table 1, in the 4:2:2 sampling format, both the EN field and the ON field may be set to have the same zoom offset for compensating for the zoom effect. If video data configured in accordance with the 4:2:0 sampling format is sub-sampled, the initial offset expressions for the Y signals may be the same as those for the Y signals operating in accordance with the 4:2:2 sampling format. However, the initial offset expressions of the C signal may be different from those of the Y signal when configured in accordance with the 4:2:0 sampling format.

In another example, referring to Table 1, if the C signal is configured in accordance with the 4:2:0 sampling format, n=2 and SR=1, the EN offset of the TT offset may be calculated as 0.75+0.25×½=0.875 based on the initial offset expression '0.75+0.25×(n−1)/n', and the ON offset of the TB offset may be calculated as 0.875+0.5=1.375 based on the initial offset expression 'EN+0.5'. It is understood that the above-example calculations given with respect to Table 1 may employ different values if performed in accordance with other example Tables.

If the input video or image data is scaled-down with the 1/n sub-sampling mode, deterioration of the video or image data may be reduced by calculating the initial offset of the Y signals and the C signals in advance (e.g., not in real-time).

While above-described with respect to ½ and ¼ sampling modes, it is understood that other example embodiments of the present invention may be directed any sampling mode, such as ⅛, 1/16 and 1/n, where n may be a natural number. If the input video or image data is scaled-down with the 1/n sub-sampling mode, the luminance signal Y and the chrominance signal C may be calculated based on the initial offset expression described above with respect to Table 1.

Returning to the example embodiment of FIG. 1, the sub-sampling block 110 may receive video data corresponding to a memory address generated by the memory address generator 114 from the system memory 130. If the video data (e.g., image data) (e.g., reduced by as much as 1/n by a sub-sampling process) is provided to the scaler core 120, a vertical SR (e.g., a vertical image size or resolution of input data divided by a vertical image size or resolution of output data) may be reduced.

Figure 3:
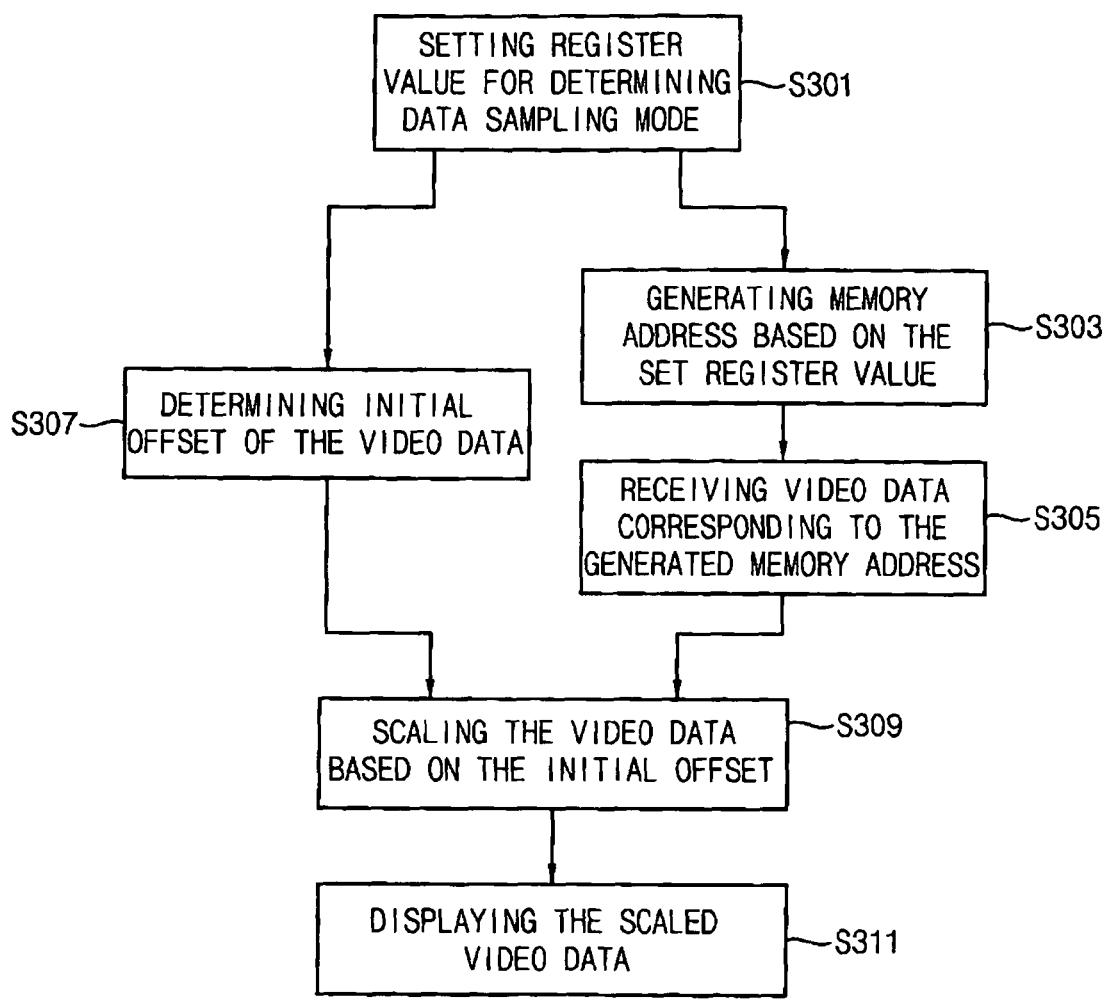
FIG. 3 is a flowchart illustrating a video signal scaling process according to another example embodiment of the present invention.

FIG. 3 is a flowchart illustrating a video signal scaling process according to another example embodiment of the present invention.

In the example embodiment of FIG. 3, the video signal scaling process may include a register value for determining a data sampling mode (S301), generating a memory address for reading video data based on the register value (S303), receiving the video data corresponding to the memory address (S305), determining an initial offset relationship of the video data (S307), scaling the video data based on the initial offset relationship (S309) and displaying the scaled video data on a display device (S311).

In the example embodiment of FIG. 3, the register value for determining the data sampling mode may include a first value indicating whether or not the data sampling mode is enabled, and a second value 'n' designating the 1/n sub-sampling mode. In an example, the initial offset relationship of the video data may be determined (S307) using the second value 'n' in accordance with the initial offset expression of, for example, Table 1. In a further example, the initial offset relationship may be calculated by hardware (e.g., a processing device) implementing an adder, a multiplier and/or other processing components. In an alternative example, the initial offset relationship may be calculated by an executable software program.

In another example embodiment of the present invention, the initial offset relationship may be calculated in advance (e.g., not in real-time) based on the initial offset expression using the second value 'n' (e.g., where n may be a natural number such as 2, 4, 8, 16, etc.). The initial offset relationship may then be stored in memory in association with the second value 'n' (e.g., system memory 130 of FIG. 1). As such, the calculated initial offset relationship may be based on a register value including the second value 'n' as set in S301.

A video scaler operating in accordance with an example embodiment of the present invention may increase an available bandwidth of a system bus, thereby improving an efficiency and stability of a system.

Example embodiments of the present invention being thus described, it will be obvious that the same may be varied in many ways. For example, while above-described example embodiments of the present invention are directed to a video scaler for scaling resolutions of images and/or video output to a display device, it is understood that that other example embodiments may be directed to any application where scaling offsets may be taken into account, and not merely to video or display applications. Further, while particular numbers are given in above example embodiments (e.g., as in Table 1), it is understood that these numbers are given for example purposes only, and that other example embodiments may be configured in accordance with other parameters.

Such variations are not to be regarded as a departure from the spirit and scope of example embodiments of the present invention, and all such modifications as would be obvious to one skilled in the art are intended to be included within the scope of the following claims.

What is claimed is:

1. A scaler, comprising:
an offset calculator receiving a data signal including a first signal and a second signal and determining an initial offset relationship between the first signal and the second signal to compensate a phase difference between the first signal and the second signal; and
a scaler core performing a scaling process on the received data signal based on a designated sampling mode and the determined initial offset relationship, wherein
the initial offset relationship is determined based on a scaling ratio (SR) and the designated sampling mode,
the designated sampling mode is a 1/n sampling mode, where n is a natural number, and
the first signal is a luminance signal and the second signal is a chrominance signal.

2. The scaler of claim 1, wherein the first signal is a luminance signal and the second signal is a chrominance signal.

3. The scaler of claim 1, further comprising:
a sub-sampling enable register configured to store the designated sampling mode; and
a memory address generator configured to generate a memory address from which the received data signal is read.

4. The scaler of claim 3, wherein the memory address is generated for reading the received data signal by as many as n lines.

5. The scaler of claim 1, wherein an initial offset of the first signal configured in accordance with a given sampling format is different as compared to an initial offset of the second signal configured in accordance with the given sampling format.

6. The scaler of claim 1, wherein an initial offset of the first signal configured in accordance with a first sampling format is the same as an initial offset of the first signal configured in accordance with a second sampling format.

7. The scaler of claim 6, wherein the first sampling format is a 4:2:0 format and the second sampling format is a 4:2:2 format.

8. The scaler of claim 1, wherein the initial offset relationship is determined based on field identifications (IDs) of the received data signal and field IDs of a display device, the field IDs of the received data signal including an even-number field and an odd-number field, the field IDs of the display device including a top field and a bottom field, the even-number field corresponding to the top field and the odd-number field corresponding to the bottom field.

9. The scaler of claim 8, wherein the initial offset of the odd-number field of the second signal is calculated by adding about 0.5 to the initial offset of the even-number field of the second signal, the second signal configured in accordance with a 4:2:0 sampling format.

10. The scaler of claim 1, wherein the scaler core includes a line memory.

11. A method of scaling a received data signal with the scaler of claim 1.

12. A method of scaling a received data signal, comprising:
receiving the data signal at a processing device, the received data signal including a first signal and a second signal to compensate a phase difference between the first signal and the second signal;
determining an initial offset relationship between the first signal and the second signal at the processing device; and
performing a scaling process on the received data signal based on a designated sampling mode and the determined initial offset relationship at the processing device, wherein
the determining calculates the initial offset relationship based on a scaling ratio (SR) and the designated sampling mode,
the designated sampling mode is a 1/n sub-sampling mode, where n is a natural number, and
the first signal is a luminance signal and the second signal is a chrominance signal.

13. The method of claim 12, further comprising:
setting a register value designating the designated sampling mode; and
generating a memory address for reading the received data signal.

14. The method of claim 13, wherein the register value includes a first value indicating whether or not the designated sampling mode is enabled and a second value corresponding to a degree of sampling.

15. The method of claim 13, wherein the memory address is generated for reading the received data signal stored in a memory device by as many as n lines.

16. The method of claim 12, wherein the first signal is a luminance signal and the second signal is a chrominance signal.

17. The method of claim 12, wherein the received data signal is at least one of a video signal and an image signal.

18. The method of claim 12, wherein the initial offset relationship is determined based on field identifications (IDs) of the received data signal and field IDs of a display device, the field IDs of the received data signal including an even-number field and an odd-number field, the field IDs of the display device including a top field and a bottom field, the even-number field corresponding to the top field and the odd-number field corresponding to the bottom field.

19. The method of claim 18, wherein the initial offset of the odd-number field of the second signal is calculated by adding about 0.5 to the initial offset of the even-number field of the second signal, the second signal configured in accordance with a 4:2:0 sampling format.

20. The method of claim 12, further comprising:
displaying the scaled received data signal as at least one of an image display and a video display on a display device.

* * * * *